United States Patent
Moore et al.

(10) Patent No.: US 7,386,692 B1
(45) Date of Patent: *Jun. 10, 2008

(54) METHOD AND APPARATUS FOR QUANTIZED DEADLINE I/O SCHEDULING

(75) Inventors: William H. Moore, Fremont, CA (US); Jeffrey S. Bonwick, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 10/922,649

(22) Filed: Aug. 20, 2004

(51) Int. Cl.
G06F 12/00 (2006.01)
G06F 9/26 (2006.01)

(52) U.S. Cl. .................... 711/158; 711/203
(58) Field of Classification Search .......... 711/158, 711/203
See application file for complete search history.

(56) References Cited

U.S. PATENT DOCUMENTS

| | | | |
|---|---|---|---|
| 5,761,501 A * | 6/1998 | Lubbers et al. | 707/100 |
| 5,787,482 A * | 7/1998 | Chen et al. | 711/158 |
| 5,812,799 A | 9/1998 | Zuravleff et al. | |
| 6,023,720 A * | 2/2000 | Aref et al. | 718/103 |
| 6,078,998 A * | 6/2000 | Kamel et al. | 711/151 |
| 6,378,036 B2 * | 4/2002 | Lerman et al. | 711/112 |
| 6,502,205 B1 | 12/2002 | Yanai et al. | |
| 6,871,011 B1 * | 3/2005 | Rahman et al. | 386/125 |
| 6,947,450 B2 * | 9/2005 | Mangin | 370/537 |
| 7,100,074 B2 * | 8/2006 | Watanabe et al. | 714/9 |
| 7,114,156 B2 | 9/2006 | Le et al. | |
| 2005/0044289 A1* | 2/2005 | Hendel et al. | 710/33 |

OTHER PUBLICATIONS

Binary Search Trees and File Organization, J.Nievergelt; Computing Surveys, vol. 6, No. 3, Sep. 1974; pp. 203-204.*

* cited by examiner

Primary Examiner—Reginald Bragdon
Assistant Examiner—Aracelis Ruiz
(74) Attorney, Agent, or Firm—Osha Liang LLP

(57) ABSTRACT

A method for storing data, including receiving a request to store data in a storage pool, determining a quantized deadline for the request, placing the request in an Input/Output (I/O) queue using the quantized deadline, and issuing the request to the storage pool using the I/O queue.

29 Claims, 5 Drawing Sheets

METHOD AND APPARATUS FOR QUANTIZED DEADLINE I/O SCHEDULING

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk. To access a file, the operating system (via the file system) typically provides file manipulation interfaces to open, close, read, and write the data within each file. More specifically, the file system stores data on the storage device by managing the allocation of space within the storage device. Typically, the volume manager provides space that is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Operating systems typically include functionality to order Input/Output (I/O) requests prior to issuing them to the physical disk. The algorithm traditionally used by the operating system to order the I/O requests is commonly referred to as the "elevator algorithm." The elevator algorithm orders the I/O requests on the basis of logical block address (LBA). After a sufficient number of I/O requests have been accumulated by the operating system, or a sufficient amount of time has passed, the ordered I/O requests are issued to the physical disk.

SUMMARY

In general, in one aspect, the invention relates to a method for storing data, comprising receiving a request to store data in a storage pool, determining a quantized deadline for the request, placing the request in an Input/Output (I/O) queue using the quantized deadline, and issuing the request to the storage pool using the I/O queue.

In general, in one aspect, the invention relates to a system for storing data, comprising a storage pool configured to store data, an I/O queue configured to store a request to store data in the storage pool, and a file system configured to receive the request, determine the quantized deadline of the request, place the request in the I/O queue using a quantized deadline of the request and a logical block address of the request, and process the request in the I/O queue.

In general, in one aspect, the invention relates to a computer system for storing a data, comprising a processor, a memory, a storage device, and software instructions stored in the memory for enabling the computer system under control of the processor, to receive a request to store data in a storage pool, determine a quantized deadline for the request, place the request in an Input/Output (I/O) queue using the quantized deadline, and issue the request to the storage pool using the I/O queue.

In general, in one aspect, the invention relates to a computer readable medium comprising software instructions for enabling a computer system under the control of a processor, to receive a request to store data in a storage pool, determine a quantized deadline for the request, place the request in an Input/Output (I/O) queue using the quantized deadline, and issue the request to the storage pool using the I/O queue.

In general, in one aspect, the invention relates to a plurality of nodes, comprising a storage pool configured to store data, an I/O queue configured to store a request to store data in the storage pool, and a file system configured to receive the request, determine the quantized deadline of the request, place the request in the I/O queue using a quantized deadline of the request and a logical block address of the request, and process the request in the I/O queue, wherein the storage pool is located on one of the plurality of nodes, wherein the I/O queue is located on one of the plurality of nodes, wherein the file system is located on one of the plurality of nodes.

Other aspects of the invention will be apparent from the following description and the appended claims.

DETAILED DESCRIPTION

Figure 1:
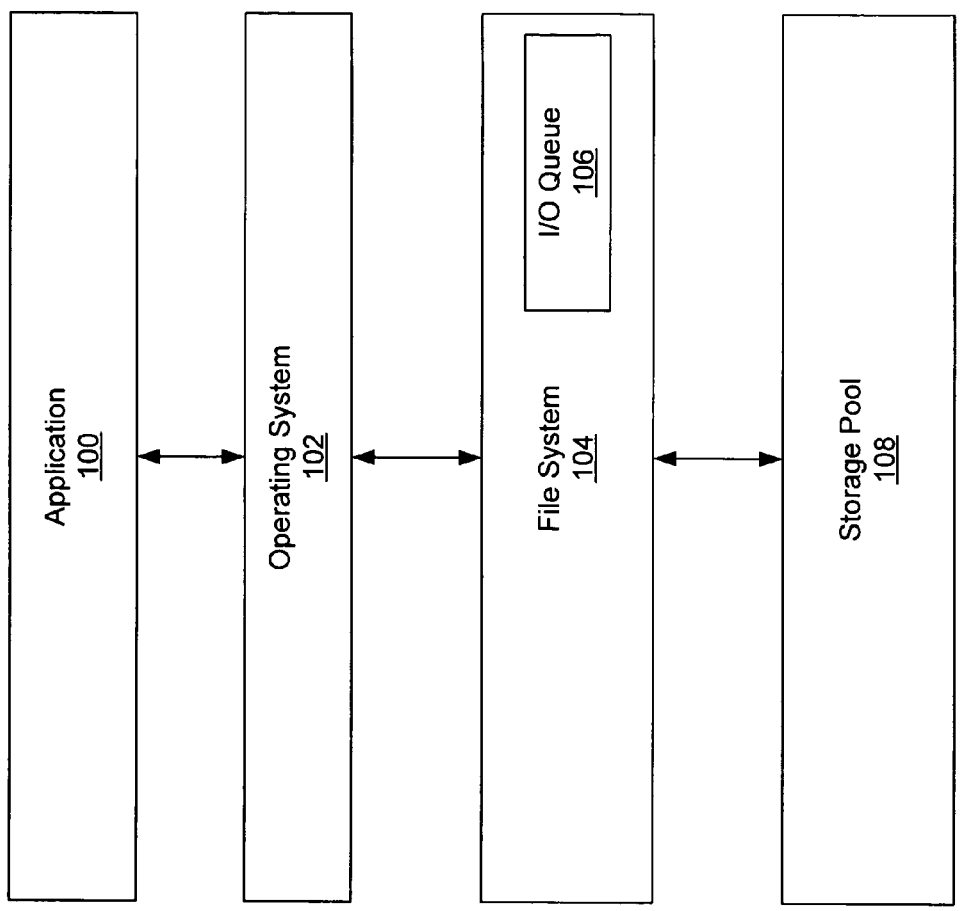
FIG. 1 shows a system architecture in accordance with one embodiment of the invention.

Exemplary embodiments of the invention will be described with reference to the accompanying drawings. Like items in the drawings are shown with the same reference numbers.

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a method and apparatus for ordering I/O requests prior to issuing them to the physical disk. Further, embodiments of the invention provide a method and apparatus for ordering I/O requests at the file system level. Further, embodiments of the invention provide a method and apparatus for ordering I/O requests using a quantized deadline and a logical block address associated with the I/O request. Further, embodiments of the invention provide a method and apparatus for ordering I/O requests in a manner that preserves I/O request priority, ensures that every I/O request is eventually issued (i.e., prevents I/O starvation through the use of deadline scheduling), and prevents unbounded disk starvation.

FIG. 1 shows a system architecture in accordance with one embodiment of the invention. The system architecture includes an application (100) interfacing with an operating system (102). Further, the operating system (102) includes functionality to interact with a file system (104), which in turn interfaces with a storage pool (108). The operating system (102) typically interfaces with the file system (104) via a system call interface (not shown). The operating system (102) provides operations for users to access files within the file system (104). These operations may include read, write, open, close, etc. In one embodiment of the invention, the file system (104) is an object-based file system (i.e., both data and metadata are stored as objects). More specifically, the file system (104) includes functionality to store both data and corresponding metadata in the storage pool (108). Thus, the aforementioned operations provided by the operating system (102) correspond to operations on objects.

More specifically, in one embodiment of the invention, a request to perform a particular operation (i.e., a transaction) is forwarded from the operating system (102), via the system call interface, to the file system (104). In one embodiment of the invention, the file system (104) translates the request to perform an operation on an object directly to a request to perform a read or write operation (i.e., an I/O request) at a physical location within the storage pool (108). Further, the file system (104) includes functionality to write the data into the storage pool (108).

In accordance with one embodiment of the invention, file system (104) may include an I/O management module (not shown), a compression module (not shown), an encryption module (not shown), a checksum module (not shown), and a metaslab allocator (not shown). Each of these aforementioned modules may be used by the file system (104) to read data from and/or write data to the storage pool (108). Each of the aforementioned modules is detailed below.

In one embodiment of the invention, the I/O management module (not shown) receives I/O requests and groups the I/O requests into transaction groups. The compression module (not shown) provides functionality to compress larger logical blocks into smaller segments, where a segment is a region of physical disk space. Further, in one embodiment of the invention, the encryption module (not shown) provides various data encryption algorithms. The data encryption algorithms may be used, for example, to prevent unauthorized access. In one embodiment of the invention, the checksum module (not shown) includes functionality to calculate a checksum for data and metadata within the storage pool. The checksum may be used, for example, to ensure data has not been corrupted. As discussed above, the file system (104) provides an interface to the storage pool (108) and manages allocation of storage space within the storage pool (108). More specifically, in one embodiment of the invention, the file system (104) uses the metaslab allocator (not shown) to manage the allocation of storage space in the storage pool (108).

In one embodiment of the invention, the storage pool (108) includes one or more physical disks. Further, in one embodiment of the invention, the storage capacity of the storage pool (108) may increase and decrease dynamically as physical disks are added and removed from the storage pool.

In one embodiment of the invention, the file system (104) includes at least one I/O queue (106). Each I/O queue (e.g., I/O queue (106)) is associated with a physical disk in the storage pool (108). Each I/O queue (e.g., I/O queue (106)) typically holds the I/O requests for a particular physical disk within the storage pool (108). Alternatively, there may be one I/O queue (106) for the entire storage pool (108) (or for a portion of the storage pool (108)). In one embodiment of the invention, the file system (104) includes functionality to order the I/O requests in each of the I/O queues (e.g., I/O queue (106)). In one embodiment of the invention, the file system (104) includes functionality to order the I/O requests using a quantized deadline (described below in FIG. 4) associated with the I/O request and a logical block address (LBA) associated with the I/O request. The ordering of the I/O requests within the I/O queue (106) is described in FIG. 4 below.

Figure 2:
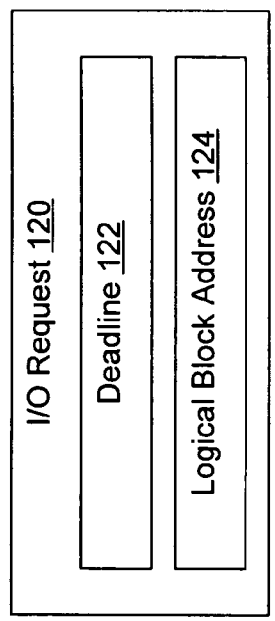
FIG. 2 shows an I/O request in accordance with one embodiment of the invention.

FIG. 2 shows an I/O request in accordance with one embodiment of the invention. The I/O request (120) includes a deadline (122) and a logical block address (LBA) (124). The deadline (122) may correspond to an actual deadline (e.g., a time by which a the I/O request must be issued, or a time frame during which the I/O request must be issued). Alternatively, the deadline (122) may correspond to priority such as: high priority (i.e., complete as soon as possible—may be used with I/O requests from real-time applications as well as synchronous requests), medium priority (i.e., complete soon, but not necessarily immediately—may be used with high priority asynchronous requests), or low priority (i.e., complete eventually—may be used with low priority asynchronous requests). In one embodiment of the invention, the LBA (124) is an n-bit value that maps to a specific location on the physical disk.

Figure 3:
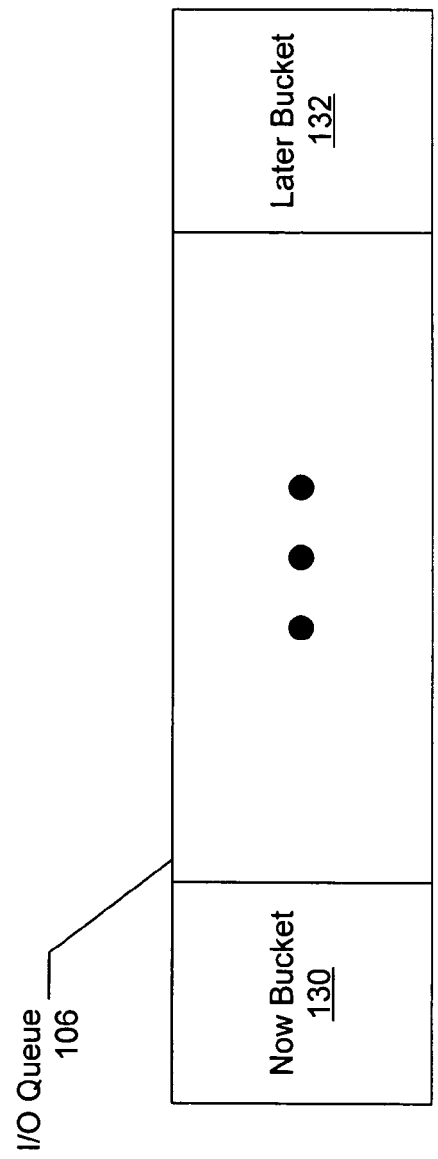
FIG. 3 shows an I/O queue in accordance with one embodiment of the invention.

FIG. 3 shows an I/O queue in accordance with one embodiment of the invention. The I/O queue (106) may include a number of buckets (e.g., a "now" bucket (130) and a "later" bucket (132)). In one embodiment of the invention each bucket (e.g., the "now" bucket (130) and the "later" bucket (132)) corresponds to a particular quantized deadline (described below in FIG. 4). Thus, all I/O requests with a given quantized deadline are stored in a particular bucket. Further, the I/O requests within an individual bucket (e.g., the "now" bucket (130) and the "later" bucket (132)) are ordered with respect to LBA (124 in FIG. 2).

In one embodiment of the invention, the I/O queue (106) is implemented as an AVL tree. The AVL tree corresponds to a partially-balanced binary tree. In one embodiment of the invention, the nodes (i.e., the I/O requests) within the AVL tree are ordered using the quantized deadline and LBA corresponding to the nodes. If an AVL tree is used to implement the I/O queue (106), then the buckets (e.g., the "now" bucket (130), the "later" bucket (132)) correspond to portions of the AVL tree. In another embodiment of the invention, the I/O queue (106) is implemented as a hash table having hash buckets. Those skilled in the art will appreciate that the I/O queue (106) may be implemented in using any data structure that can maintain the order of the I/O requests.

Figure 4:
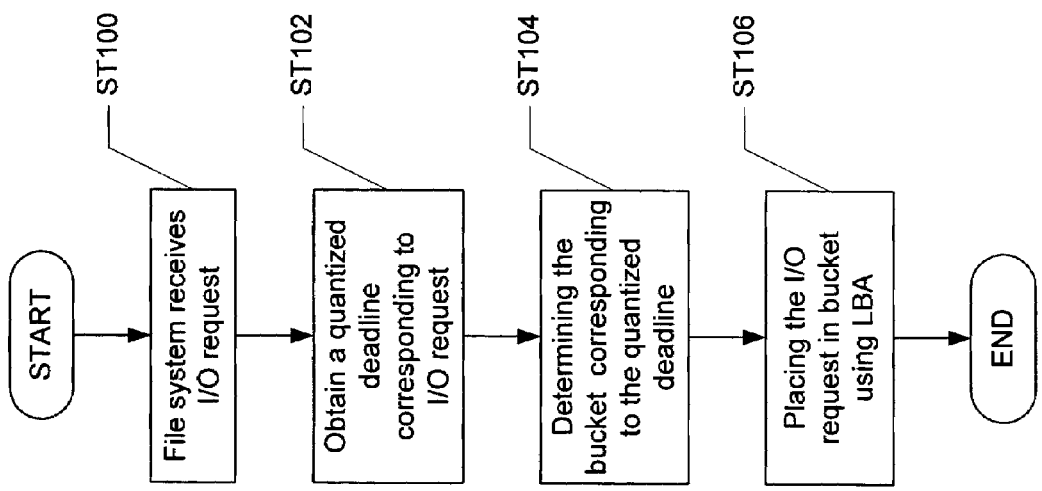
FIGS. 4 and 5 show flowcharts in accordance with one embodiment of the invention.
Figure 5:
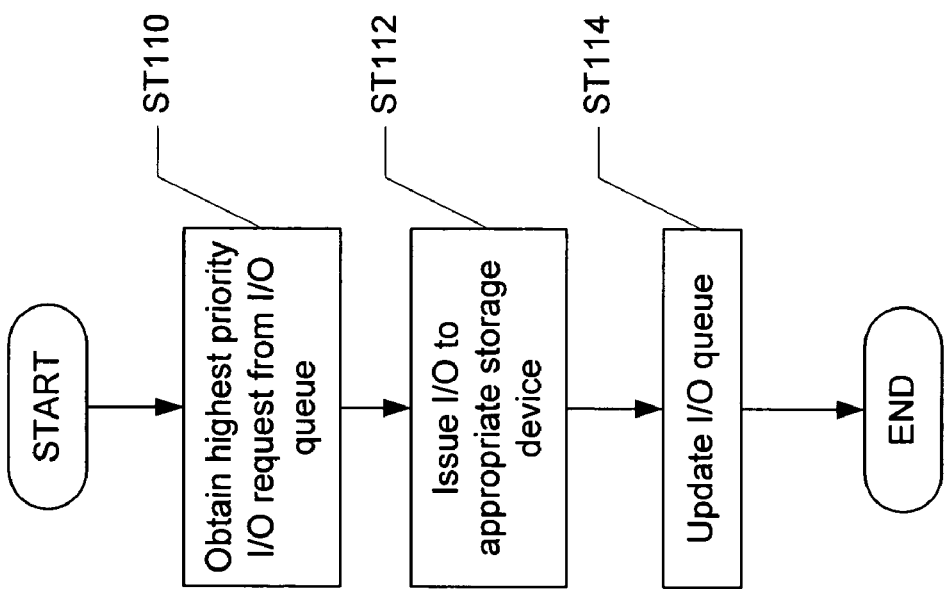

FIGS. 4 and 5 show flowcharts in accordance with one embodiment of the invention. FIG. 4 shows a flowchart for placing an I/O request in an I/O queue in accordance with one embodiment of the invention. Initially, an I/O request is received by the file system (ST100). A quantized deadline is subsequently determined for the I/O request (ST102). In one embodiment of the invention, a quantized deadline corresponds to a period of time when a particular request is to be performed. The quantized deadline is used to coarsely order the I/O request in the I/O queue. In one embodiment of the invention, the quantized deadlines are set in millisecond intervals. For example, consider the following quantized deadlines: now (0-99 ms), soon (100-199 ms), and later (199 ms+). Thus, when an I/O request having a deadline of 75 ms is received, then the quantized deadline for the I/O request is considered "now". Note, the quantized deadlines may be set using any magnitude (e.g., seconds, millisecond, nanoseconds, etc.) and any duration of time interval. Further, the quantized deadlines may be identified using any type of label. In one embodiment of the invention, the intervals of the quantized deadlines may be adjusted such that the buckets corresponding to the quantized deadline contain only (or slightly more than) the number of I/O requests that may be processed prior to the I/O requests in the bucket expiring.

Once the quantized deadline for the I/O request is determined, the bucket corresponding to the quantized deadline is determined (ST104). In one embodiment of the invention, if the I/O queue is implemented as an AVL tree, then determining the bucket corresponding to the quantized deadline includes identifying the portion of the AVL tree that corresponds to the bucket. Alternatively, if the I/O queue is implemented as a hash table having hash buckets, then determining the bucket corresponding to the quantized deadline includes identifying the appropriate hash bucket.

Once the corresponding bucket is determined, the I/O request is placed in the bucket in an order determined by the LBA of the I/O request (ST106). In one embodiment of the invention, the LBA of the I/O request that is being inserted into the I/O queue is compared with the LBA's of the I/O requests already in the bucket, and then inserted into the appropriate location in the bucket. The insertion of the I/O request into the I/O queue includes inserting the I/O request into the appropriate location in the data structure implementing the I/O queue (e.g., linked list, an array, an AVL tree, etc).

FIG. 5 shows a flowchart for processing the I/O request in the I/O queue in accordance with one embodiment of the invention. Initially, the highest priority I/O request is obtained from the I/O queue (ST110). In one embodiment of the invention, the highest priority request corresponds to the I/O request in the "now" bucket with the highest priority based on LBA. If the I/O queue is implemented as an AVL tree, then the highest priority I/O request is the I/O request at the left most leaf of the AVL tree.

Once the highest priority I/O request has been received, the I/O request is issued to the appropriate storage device (e.g., a physical disk) (ST112). Once the highest priority I/O request has been issued, the highest priority I/O request is removed from the I/O queue, and the I/O queue is updated (ST114). In one embodiment of the invention, the I/O queue is updated by moving one or more I/O requests from a bucket at the back of the I/O queue to a bucket closer to the front of the I/O queue (e.g., from the "later" bucket to the "now" bucket). Alternatively, if the I/O queue is implemented as an AVL tree, then I/O queue is updated by rebalancing the AVL tree.

Those skilled in the art will appreciate that methods described in FIGS. 4 and 5 may occur concurrently within the system. As such, when new I/O requests are received by the file system, the file system places the I/O request in the I/O queue, thereby reordering the I/O queue. As noted above, the intervals of the quantized deadlines may be adjusted such that the buckets corresponding to the quantized deadline contain only (or slightly more than) the number of I/O requests that may be processed prior to the expiration of the deadlines of the I/O requests in the bucket. However, in some situations, all of the I/O requests in the bucket may not be able to be processed prior to the expiration of the deadlines of the I/O requests.

In such situations, in order to ensure that the I/O requests with expired deadlines are not preempted by other newly arriving high priority I/O requests, the unprocessed I/O requests (typically unprocessed I/O requests from the now bucket) are placed in an "immediate" bucket. The "immediate" bucket (not shown in FIG. 3) corresponds to a bucket that has a higher priority than the now bucket. Further, an I/O request may not be initially placed in the "immediate" bucket, rather, the I/O request may only move to the "immediate" bucket if the I/O request was previously in the now bucket and unprocessed while the I/O request's deadline expired. Further, when new I/O requests are received by the file system, the new I/O requests may only be placed in buckets with less priority than the "immediate" bucket (i.e., in the "now" bucket, the "later" bucket, etc.). In this manner, the I/O requests with expired deadlines are processed.

Those skilled in the art will appreciate that while the aforementioned discussion of embodiments of the invention described a file system that functions without a volume manager, the invention may be implemented on a system architecture with a volume manager. Those skilled in the art will appreciate that while the above discussion of the embodiments of the invention used LBA to order the I/O requests within the corresponding buckets, the I/O request may be ordered using any criteria that minimizes latency or satisfies other performance requirement. The criteria may include information about disk geometry, other characteristics of the disk, etc.

Figure 6:
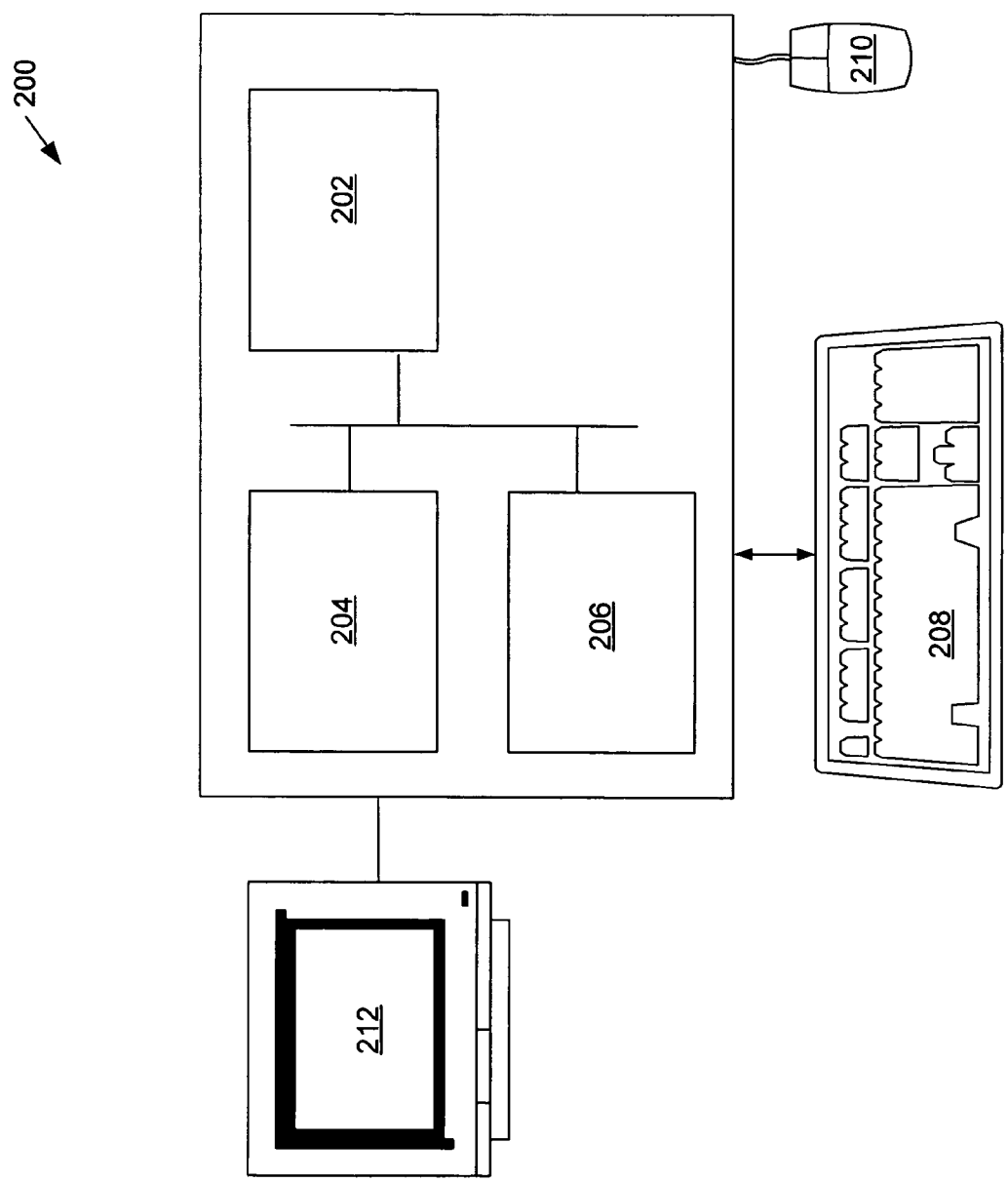
FIG. 6 shows a computer system in accordance with one embodiment of the invention.

The invention may be implemented on virtually any type of computer regardless of the platform being used. For example, as shown in FIG. 6, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (200) may be located at a remote location and connected to the other elements over a network. Further, the invention may be implemented on a distributed system having a plurality of nodes, where each portion of the invention (e.g., file system, the storage pool, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing data, comprising:
   receiving a request to store data at a logical block address in a storage pool;
   determining a quantized deadline for the request;
   placing the request in an Input/Output (I/O) queue using the quantized deadline; and
   issuing the request to the storage pool using the I/O queue,
   wherein the I/O queue is an AVL tree, and
   wherein placing the request in the I/O queue comprises placing the request in the AVL tree with respect to the quantized deadline and the logical block address.

2. The method of claim 1, wherein the I/O queue comprises a plurality of buckets.

3. The method of claim 2, wherein the placing the request in the I/O queue further comprises placing the request in one of the plurality of buckets corresponding to the quantized deadline.

4. The method of claim 3, wherein the request is ordered in the one of the plurality of buckets using the logical block address.

5. The method of claim 2, wherein the plurality of buckets comprises a "now" bucket and a "later" bucket.

6. The method of claim 1, further comprising:
   processing a highest priority request in the AVL tree; and
   re-balancing the AVL tree after the highest priority request has been processed.

7. The method of claim 1, wherein the I/O queue is associated with a file system.

8. A system for storing data, comprising:
   a storage pool configured to store data;
   an I/O queue configured to store a request to store data at a logical block address in the storage pool; and
   a file system configured to:
   receive the request,
   determine a quantized deadline for the request,
   place the request in the I/O queue using the quantized deadline and the logical block address, and
   process the request in the I/O queue,
   wherein the I/O queue is an AVL tree, and
   wherein placing the request in the I/O queue comprises placing the request in the AVL tree with respect to the quantized deadline and the logical block address.

9. The system of claim 8, further comprising:
   an application configured to issue the request to the file system.

10. The system of claim 8, wherein the I/O queue is located in the file system.

11. The system of claim 8, wherein the file system is further configured to issue the request to the storage pool using the I/O queue.

12. The system of claim 8, wherein the I/O queue comprises a plurality of buckets.

13. The system of claim 12, wherein the file system is further configured to place the request in one of the plurality of buckets corresponding to the quantized deadline.

14. The system of claim 13, wherein the request is ordered in the one of the plurality of buckets using the logical block address.

15. The system of claim 12, wherein the plurality of buckets comprises a "now" bucket and a "later" bucket.

16. The system of claim 15, wherein the file system is further configured to:
   process the "now" bucket; and
   update the I/O queue after the "now" bucket has been processed.

17. The system of claim 16, wherein processing the "now" bucket comprises issuing all requests in the "now" bucket to the storage pool.

18. The system of claim 8, wherein the file system is further configured to:
   process a highest priority request in the AVL tree; and
   re-balance the AVL tree after the highest priority request has been processed.

19. A computer system for storing data, comprising:
   a processor;
   a memory;
   a storage device; and
   software instructions stored in the memory for enabling the computer systems under control of the processor, to:
   receive a request to store data at a logical block address in a storage pool;
   determine a quantized deadline for the request;
   place the request in an Input/Output (I/O) queue using the quantized deadline; and
   issue the request to the storage pool using the I/O queue,
   wherein the I/O queue is an AVL tree, and
   wherein placing the request in the I/O queue comprises placing the request in the AVL tree with respect to the quantized deadline and the logical block address.

20. The computer system of claim 19, wherein the I/O queue comprises a plurality of buckets.

21. The computer system of claim 20, wherein placing the request in the I/O queue further comprises placing the request in one of the plurality of buckets corresponding to the quantized deadline.

22. The computer system of claim 21, wherein the request is ordered in the one of the plurality of buckets using the logical block address.

23. The computer system of claim 19, further comprising software instructions stored in the memory for enabling the computer system, under control of the processor, to:
- process a highest priority request in the AVL tree; and
- re-balance the AVL tree after the highest priority request has been processed.

24. A computer readable medium comprising software instructions for enabling a computer system, under the control of a processor, to:
- receive a request to store data at a logical block address in a storage pool;
- determine a quantized deadline for the request;
- place the request in an Input/Output (I/O) queue using the quantized deadline; and
- issue the request to the storage pool using the I/O queue,
- wherein the I/O queue is an AVL tree, and
- wherein placing the request in the I/O queue comprises placing the request in the AVL tree with respect to the quantized deadline and the logical block address.

25. The computer readable medium of claim 24, wherein the I/O queue comprises a plurality of buckets.

26. The computer readable medium of claim 25, wherein placing the request in the I/O queue further comprises placing the request in one of the plurality of buckets corresponding to the quantized deadline.

27. The computer readable medium of claim 26, wherein the request is ordered in the one of the plurality of buckets using the logical block address.

28. The computer readable medium of claim 24, further comprising software instructions for enabling the computer system, under the control of the processor, to:
- process a highest priority request in the AVL tree; and
- re-balance the AVL tree after the highest priority request has been processed.

29. A plurality of nodes, comprising:
- a storage pool configured to store data;
- an I/O queue configured to store a request to store data at a logical block address in the storage pool; and
- a file system configured to:
  - receive the request,
  - determine a quantized deadline for the request,
  - place the request in the I/O queue using the quantized deadline and the logical block address, and
  - process the request in the I/O queue,
- wherein the storage pool is located on one of the plurality of nodes,
- wherein the I/O queue is located on one of the plurality of nodes,
- wherein the file system is located on one of the plurality of nodes,
- wherein the I/O queue is an AVL tree, and
- wherein placing the request in the I/O queue comprises placing the request in the AVL tree with respect to the quantized deadline and the logical block address.

* * * * *